United States Patent
Gresch

[11] Patent Number: 5,183,280
[45] Date of Patent: Feb. 2, 1993

[54] MULTI-PURPOSE ELEVATED BUCKET

[76] Inventor: Jeffrey Gresch, 4541 Patrick Dr., R.R. 5, Kennesaw, Ga. 30144-1601

[21] Appl. No.: 774,626

[22] Filed: Oct. 10, 1991

[51] Int. Cl.⁵ .............................................. B62B 3/00
[52] U.S. Cl. .................... 280/79.5; D32/53; 248/129; 280/47.34
[58] Field of Search .......... 280/47.34, 79.5, 79.2; 248/129; 220/660; 15/264; 4/554; D32/53, 53.1, 54

[56] References Cited

U.S. PATENT DOCUMENTS

| D. 149,701 | 5/1948 | Smith | 280/79.2 |
| D. 233,003 | 10/1974 | Karn, Jr. et al. | D32/53 |
| D. 248,610 | 7/1978 | Schwartz | D32/53 |
| D. 290,897 | 7/1987 | Streit | D32/53 |
| D. 295,094 | 4/1988 | Tapdrup | D32/53 |
| 1,628,722 | 5/1927 | Haertel | 280/79.2 |
| 2,531,131 | 11/1950 | Johnson | 280/79.5 |
| 4,908,904 | 3/1990 | Smith, Jr. | 15/264 |

FOREIGN PATENT DOCUMENTS

| 450809 | 8/1948 | Canada | 280/79.2 |

Primary Examiner—Eric D. Culbreth
Attorney, Agent, or Firm—James B. Middleton

[57] ABSTRACT

A multipurpose container has a bucket supported above the floor by a skirt. The skirt extends from the upper edge of the bucket down and out, so the skirt provides a good base for the bucket, with the bucket suspended centrally of the skirt. Slots are provided in the skirt as handholds, and a bail is optionally received on the bucket to provide dual lifting handles. The lower edge of the skirt may receive casters, either directly, or on a platform that is fixed to the skirt. A drain in the bottom of the bucket can receive a drain hose, knockouts being provided to open the bucket, and to allow the drain hose to pass through the skirt.

7 Claims, 1 Drawing Sheet

U.S. Patent    Feb. 2, 1993    5,183,280
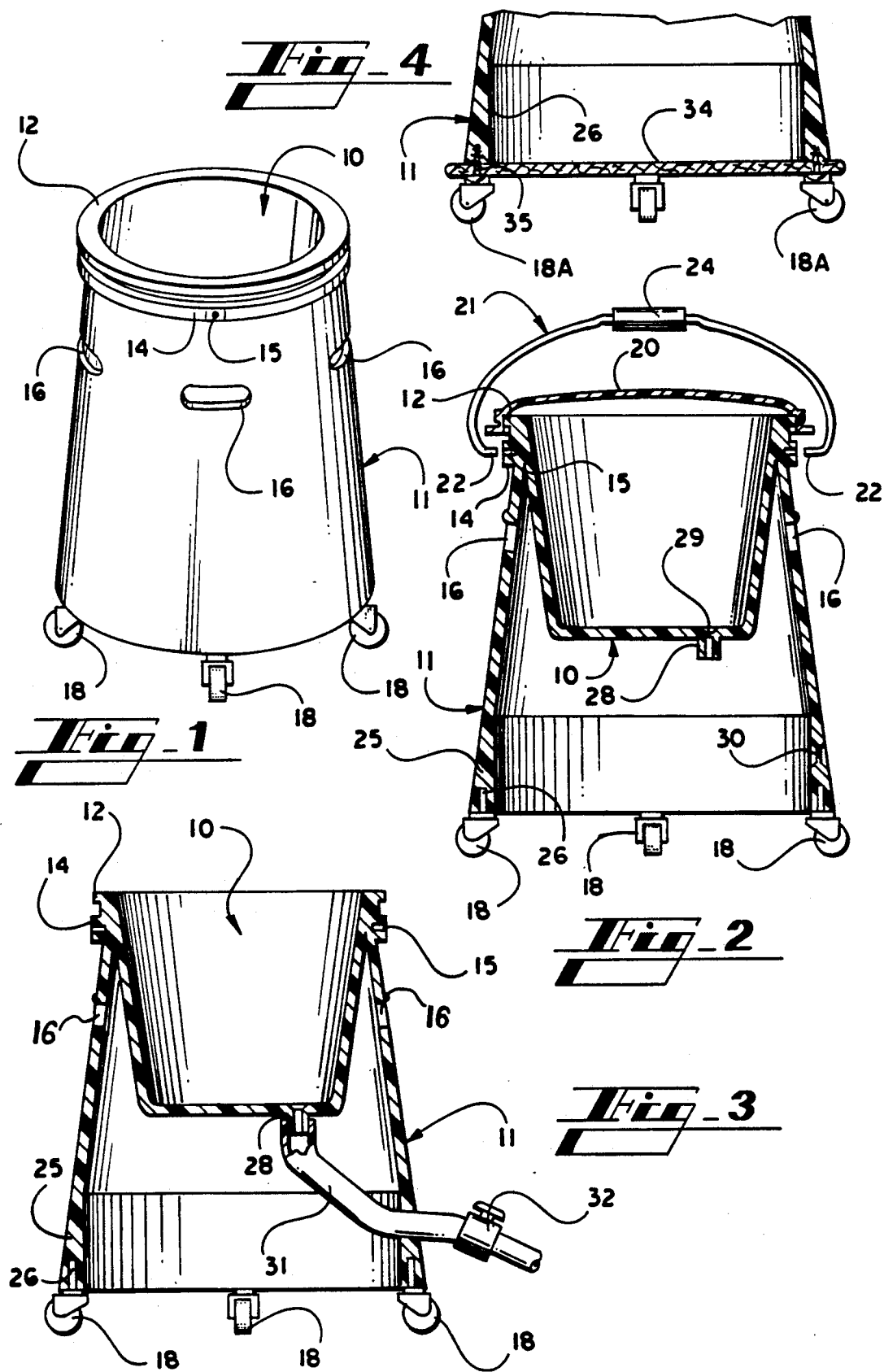

MULTI-PURPOSE ELEVATED BUCKET

INFORMATION DISCLOSURE STATEMENT

Buckets, or containers of various sorts, are utilized for numerous activities. One of the very common uses is as a janitorial bucket wherein detergent and water are provided in the bucket for mopping floors, cleaning walls, cleaning blinds and the like, and including cleaning automobiles and other vehicles. The usual bucket utilized for these purposes is a simple container, frequently with a bail type handle. Some of the prior art buckets include wheels to allow the bucket to roll along the floor as the person works. The wheels are sometimes fixed substantially directly to the bucket, and sometimes to a flange or the like on which the bucket sits.

The disadvantages of the prior art buckets include the fact that the bucket is close to the ground or floor, requiring considerable stooping or bending in using the bucket. Some of the prior art buckets are made of very thin plastic, and when the bucket is lifted by the bail, the bucket substantially collapses, perhaps spilling dirty water. The prior art buckets are generally not variable in their function. If the bucket is not provided with casters, there is no provision for adding casters, and if the bucket is not fixed to platform there is no provision for attaching the bucket to a platform. There is therefore a continuing need for a multi-purpose bucket that is adaptable by the user to suit the intended function.

SUMMARY OF THE INVENTION

This invention relates generally to containers and the like, and is more particularly concerned with a multi-purpose bucket that is elevated from the supporting surface.

The present invention provides a container including a bucket of a generally conventional shape, the bucket being supported above the supporting surface by a skirt fixed to the upper edge of the bucket. The skirt may define a plurality of handholds therein to allow lifting of the bucket, and the bucket may further include means for receiving a bail as an additional handle means. The skirt optionally may receive casters, or a platform that may receive casters.

Due to the above described arrangement, the container of the present invention may also include a drain in the bottom of the bucket, and a drain hose extending from the drain in the bucket, through the skirt, for draining the contents of the bucket.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing one form of container made in accordance with the present invention;

FIG. 2 is a diametrical cross-sectional view taken through the container shown in FIG. 1, and also showing a cover and a bail in conjunction with the container;

FIG. 3 is a view similar to FIG. 2 but showing the bucket with a drain hose in place; and, FIG. 4 is a fragmentary cross-sectional view showing a platform fixed to the container illustrated in FIGS. 1-3.

DETAILED DESCRIPTION OF THE EMBODIMENT

Referring now more particularly to the drawings, and to that embodiment of the invention here presented by way of illustration, the container shown in FIG. 1 includes a bucket indicated at 10 and a frustoconical skirt indicated generally at 11. The bucket 10 includes an upper edge 12 which is preferably somewhat enlarged to reinforce the upper edge of the container. As will be discussed further hereinafter, the upper edge 12 may also be adapted to receive a cover or the like.

Below the upper edge 12, there is here shown a reinforcing annulus 14 defining a socket 15 for receiving a bail. Those skilled in the art will understand that the reinforcing ring is optional; but, if the container is formed of relatively thin polymeric material, the reinforcing ring 14 will greatly stabilize the container for heavy use.

The skirt 11 extends from generally the upper portion of the bucket 10, downwardly and outwardly to support the bucket 10. There is a plurality of handholds 16 which are holes defined in the skirt 11. There may be any number of such handholds 16, but it is contemplated that four such holes will be provided to allow a person to grip the container from opposite sides.

Finally, the lowermost end of the skirt 11 is here shown as receiving a plurality of casters 18.

FIG. 2 shows a cross-section of the container shown in FIG. 1 to illustrate the construction of the container in more detail. In FIG. 2 it will be seen that the bucket 10 is frustoconical in shape, the upper edge 12 being the base of the cone, and the bottom of the bucket 19 being the upper, or smaller, end of the frustum of a cone. The bucket 10 is therefore the reverse of the skirt 11 which has its base downwardly and its smaller end at the top where the skirt 11 is connected to the bucket 10. It will of course be understood that the upper end of the bucket 10 is larger than the upper end of the skirt 11, so the bucket 10 is supported by the skirt 11. The bucket 10 and skirt 11 are here shown as formed integrally, but those skilled in the art will understand that the two pieces may be formed separately and subsequently fixed together by gluing, welding or even riveting or the like. The important feature of the present invention is that the bucket 10 is supported centrally of the skirt 11, the skirt 11 supporting the bucket 10 above the supporting surface. While it is contemplated that the container will be formed of polyethylene or other polymeric material, it will be understood that the container may equally well be formed of metal or other materials, and manufacturing techniques will vary with the particular material selected.

Looking further at FIG. 2 of the drawings, the upper edge 12 of the bucket 10 defines an outwardly turned flange for receiving a conventional cover 20. Depending on the intended use, the cover 20 may include an O-ring or other seal, or the flange may be otherwise shaped to form a seal without the addition of O-rings or the like.

Covers such as the cover 20 are presently manufactured in standard sizes, and it is contemplated that the container of the present invention will be manufactured in standard sizes to allow use of the readily available covers.

The handholds 16 are shown in FIG. 2, and it will be seen that there is a space between the skirt 11 and the bucket 10 at the location of the handholds 16. It is preferred that the holes 16 be high enough on the skirt 11 to allow a good balance when the container is lifted by the handhold 16. This would dictate that the holes 16 be at the very top of the skirt 11; however, one needs some space inside the skirt 11 to receive the fingers, so the holes must be down somewhat from the junction of the skirt 11 and the bucket 10 With these criteria in mind, the holes 16 should be as high on the skirt as possible.

With the above described construction in mind, it should be realized that the containers of the present invention can be stacked, either filled or empty. If the containers are empty, the upper portion of one container will be received within the skirt portion of another, and the buckets 10 will nest. As a result, a plurality of empty containers can be stored or shipped rather economically. If the containers are filled, the bucket 10 will of course be closed with a cover 20. In this case, the upper portion of one container will be received within the confines of the skirt 11, and the bottom of one bucket 10 will rest on the cover 20 of another bucket 10.

Since the containers of the present invention can be shipped full or empty, and stacked in either case, those skilled in the art will realize that the containers are admirably suited for paint, dry wall joint compound and other such commodities. Of course the containers can also be used for other items such as nails, screws and other hardware, small parts etc.

In addition to the handholds 16, there is a bail 21. Again, bails 21 are currently available for standard buckets, and it is contemplated that the container of the present invention will be sized to utilize the existing bails. The bail 21 includes inwardly turned pins 22 to be received within the sockets 15 and a grip 24. The bail 21 is generally formed of steel wire or the like, so the pins 22 can be inserted into or removed from the sockets 15 as desired by appropriate flexing of the wire. As a result, the bail 21 can be installed for use when preferred and easily removed when it is not desired.

The lowermost end of the skirt 11 is thickened as indicated at 25. This portion 25 then defines a plurality of vertically oriented holes 26 which may receive the casters 18. The container as shown in FIG. 2 of the drawings defines a drain indicated at 28, the drain 28 including a knockout 29. The skirt 11 also includes a knockout 30. If the user does not wish to use the drain 28, the knockouts 29 and 30 can remain in place and the bucket can be utilized as a normal bucket.

If it is desired to have a drain in the bucket 10, a drain hose can be installed as shown in FIG. 3 of the drawings. In FIG. 3 it will be seen that the knockout 29 in the drain 28 has been removed, and a hose 31 has been slipped over the drain 28. The knockout 30 has also been removed, and the hose 31 passes through the resulting opening in the skirt 11 so water can drain from the bucket 10 and be delivered outside the skirt 11.

Those skilled in the art will understand that any form of plug or stopper may be utilized to hold liquid in the bucket 10. As shown in FIG. 3, there is a clamp 32 installed on the hose 31. While this is one well known device for terminating liquid flow, it will be understood that a conventional stopper or other means might equally well be utilized to terminate flow when desired.

Looking next at FIG. 4 of the drawings, the lower end of the skirt 11 receives a platform 34. In FIG. 2 of the drawings, the casters 18 are received directly in the holes 26 in the thickened portion 25 of the skirt 11. In FIG. 4 of the drawings, the holes 26 receive screws 35. The screws 35 are here shown as wood screws, or other self threading screws. It will be understood that, alternatively, the hole 26 may be threaded, and the screw 35 may be a machine screw. With the platform 34 attached to the skirt 11, the platform 34 may have casters 18A fixed thereto.

The platform 34 is here shown as extending only slightly beyond the skirt 11; however, it will be understood that the platform 34 may be utilized in order to provide a wider base for the container of the present invention, or to attach the container of the present invention to a platform containing additional containers, or additional equipment or the like.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A multipurpose container comprising a bucket, a skirt fixed to said bucket and extending below said bucket, and handle means for selectively lifting said container, said bucket being frustoconical in shape and including an upper edge and a bottom said bottom having a diameter less than the diameter of said upper edge, said skirt being fixed to said bucket adjacent to said upper edge of said bucket so that said skirt surrounds said bucket, said skirt having an upper edge generally the same size as said upper edge of said bucket and fixed thereto, said skirt having a lower edge below said bottom of said bucket and larger than said upper edge so that said skirt is frustoconical for providing stability for said container, said handle means including a plurality of holes defined in said skirt adjacent to said upper edge of said skirt, said plurality of holes constituting handholds.

2. A multipurpose container as claimed in claim 1, wherein said handle means includes a bail selectively fixable to said upper edge of said skirt diametrically thereof.

3. A multipurpose container as claimed in claim 2, and further including a cover selectively receivable on said bucket.

4. A multipurpose container as claimed in claim 1, and further including a plurality of casters fixed to said lower edge of said skirt.

5. A multipurpose container as claimed in claim 4, said lower edge of said skirt defining a plurality of generally vertically oriented holes therein, said plurality of casters being selectively receivable in said vertically oriented holes.

6. A multipurpose container as claimed in claim 1, said lower edge of said skirt defining a plurality of generally vertically oriented holes therein, said container further including a platform selectively fixable to said lower edge of said skirt, and a plurality of casters carried by said platform.

7. A multipurpose container comprising a bucket, a skirt fixed to said bucket and extending below said bucket, and handle means for selectively lifting said container, said bucket including an upper edge and a bottom, said skirt being fixed to said bucket adjacent to said upper edge of said bucket so that said skirt surrounds said bucket, said skirt having an upper edge generally the same size as said upper edge of said bucket and fixed thereto, said skirt having a lower edge larger than said upper edge for providing stability for said container, and further including a plurality of casters fixed to said lower edge of said skirt, said lower edge of said skirt defining a plurality of generally vertically oriented holes therein, said plurality of casters being selectively receivable in said vertically oriented holes, and wherein said skirt defines a plurality of holes therein adjacent to said upper end of said skirt, said plurality of holes constituting a plurality of handholds, and a bail selectively fixable to said container diametrically thereof, said handle means comprising said handholds and said bail, and further including a cover selectively receivable on said bucket, said bottom of said bucket including a drain for selectively receiving a drain hose, and a knockout for selectively opening the interior of said bucket into said drain.

* * * * *